United States Patent [19]

Davies

[11] Patent Number: 5,080,970
[45] Date of Patent: Jan. 14, 1992

[54] POLY CYANO ARYL ETHER BEARING MATERIALS

[75] Inventor: Glyndwr J. Davies, Dunchurch, England

[73] Assignee: T&N Technology Limited, Cawston, England

[21] Appl. No.: 460,949

[22] PCT Filed: Jun. 29, 1989

[86] PCT No.: PCT/EP89/00740
  § 371 Date: Feb. 27, 1990
  § 102(e) Date: Feb. 27, 1990

[87] PCT Pub. No.: WO90/00686
  PCT Pub. Date: Jan. 25, 1990

[30] Foreign Application Priority Data

Jul. 5, 1988 [GB] United Kingdom ............... 8815990

[51] Int. Cl.$^5$ .................. B32B 15/08; B32B 27/00
[52] U.S. Cl. .................... 428/332; 428/457; 528/211
[58] Field of Search .............. 428/457, 332; 528/211

[56] References Cited

U.S. PATENT DOCUMENTS 4,640,975  2/1987  Matsuo et al. .................... 528/211

FOREIGN PATENT DOCUMENTS 0193003  9/1986  European Pat. Off. .
0193114  9/1986  European Pat. Off. .

*Primary Examiner*—Thomas J. Herbert, Jr.
*Attorney, Agent, or Firm*—William R. Hinds

[57] ABSTRACT

A plain machinery bearing having a working surface comprising poly cyano aryl ether, which working surface may further comprise additives including reinforcing additives selected, for example, from the group consisting of mica, carbon fiber, aramid fiber, metallic fiber and mineral fiber, and/or may further comprise friction and wear reducing agents. The thickness of the polymer may range from 0.1 to 1 mm when bonded to a steel, copper alloy or aluminum alloy backing as a solid bearing material, and from 0.01 to 0.05 mm when used as a thin overlay material on top of another bearing material.

11 Claims, No Drawings

POLY CYANO ARYL ETHER BEARING MATERIALS

The present invention relates to plain bearings and materials for plain bearings.

High performance, crystalline, aromatic thermoplastic polymers such as poly aryl ether ketones are known for use in plain bearing applications. One polymer, poly ether ether ketone (PEEK), whilst possessing excellent mechanical strength properties and resistance to oil degradation at high temperatures has shown less than ideal surface properties in marginally lubricated applications in the unmodified condition. To overcome these problems various fillers and dry lubricant materials have been added to improve the surface properties. The result of this is a weakening of the matrix and an increase in the processing complexity which leads to economic disadvantages.

We have now found a polymer which possesses inherently superior surface properties and overcomes the above disadvantages.

According to a first aspect of the present invention a material for the working surface of a plain bearing operated in the presence of a lubricant comprises poly cyano aryl ether (PCAE).

We have found that the surface properties of PCAE are particularly suited to lubricated bearing applications because of the highly active polar nitrile (—CN) groups. These groups have a strong affinity for both the base oil and the boundary lubricant additives in lubricating oils. Thus, retention of oil film characteristics are good which leads to improved life in marginally lubricated conditions where rubbing contact between the bearing surface and the counterface may occur such as, for example, at start up in an automotive engine.

PCAE may be used as a solid bearing material, i.e. where the bearing material layer is comprised exclusively of the polymer. In this case the polymer layer thickness may lie between 0.1 to 1 mm, a preferred range maybe 0.2 to 0.4 mm.

PCAE may alternatively be used as a thin overlay layer on top of another bearing material such as, for example, an aluminum-tin alloy. The metallic bearing material may itself have a stronger backing material such as steel. In this case where PCAE is used as an overlay the metallic bearing layer contributes to a high overall fatigue strength and the polymer contributes improved surface properties in boundary lubricated conditions. A PCAE overlay may have a thickness in the range from 0.01 to 0.05 mm and a preferred thickness range between 0.02 and 0.03 mm.

PCAE may be bonded to steel either directly or via a bonding interlayer such as sintered bronze or sprayed aluminium bronze, for example.

Other backing materials to which PCAE may be bonded include stainless steel, aluminium alloys and various copper based alloys.

According to a second aspect of the present invention there is provided a plain machinery bearing for operation in the presence of a lubricant, the bearing having a working surface comprising poly cyano aryl ether.

Such bearings may include thin-wall half bearings, thrust washers and wrapped bushes, for example. Lubrication may be by oil or grease.

The polymer matrix material may be modified by the inclusion of other materials such as reinforcing additives or friction and wear reducing agents.

Reinforcing additives may include mica, carbon fibre, aramid fibre, e.g. Kevlar (trade name), metallic or mineral fibres, for example.

Friction and wear reducing agents may include alumina, antimony oxide, aramid fibre, asbestos, barium sulphate, boron nitride, cadmium sulphide, calcium fluoride, carbon fibres, ceramic powders (fine), clay, chromic oxide, coke, copper oxide, ferric oxide, glass, graphite, graphite fluoride, lead fluoride, lead iodide, lead oxides, lead sulphide, manganese ammonium phosphate, metal fibre, metal flake, metal powders, mica, molybdenum disulphide, phthaloycyanines, polyoxybenzoate, PPS, PTFE, silicon carbide, silicon, talc, wollastonite, zinc sulphide.

PCAE may be processed by any conventional techniques such as compounding and tape extrusion, compounding and moulding, powder coating, solvent casting and injection moulding for example.

In order that the present invention may be more fully understood examples will now be described by way of illustration only.

EXAMPLE 1

PCAE, in the form of ID 300 (trade name) manufactured by Idemitsu Kosan Company of Japan, is further compounded with 10% by volume of carbon fibres, 5% by volume of graphite, 5% by volume bronze and 10% by volume of PTFE.

The mixture is compounded together in the melt phase using a conventional twin screw compounding extruder. The temperature is maintained between 350° and 390° C. at which temperature the PCAE is molten and the PTFE quite viscous. The resulting blend is extruded into the form of a strand which upon solidification is broken up into granules. The granules are extruded again into continuous tape 20 cm wide and 400 micrometers thick.

The tape is then bonded to 1.5 mm thick steel strip which has a 0.5 mm porous tin bronze interlayer thereon. The backing strip is preheated to between 350° and 380° C. by passing through an induction heating coil, the backing strip having a layer of the polymer tape on top and passing the heated strip and tape through a rolling mill such that the tape is impregnated into the bronze interlayer.

EXAMPLE 2

PCAE powder, 100% of which passes through a BS 200 mesh sieve is intimately mixed with 20% by weight of ICI Fluon VX-2 (trade name) which consists of 20% by volume of bronze powder and 20% by volume of graphite filled PTFE moulding powder.

The powders are mixed in a high speed mixer. The polymer powder is fabricated into a test bearing lining in the following manner. A 1.5 mm thick steel strip is used as a backing, one surface of which is abraded to give a clean rough surface. Pre-dried polymer powder mixture is spread to a thickness of 1.5 mm by means of a vibrating feed hopper onto a substrate and then heated by induction heating to a temperature of between 350° and 380° C. The blank is rolled to consolidate the powder into a continuous, coherent lining. The coated blank is then allowed to cool naturally and formed into a bearing.

EXAMPLE 3

10% by weight of pre-dried PCAE powder is mixed with 90% benzyl benzoate. The mixture is heated and stirred at a temperature of between 250° and 290° C. to dissolve the polymer powder in the benzyl benzoate. A cold bearing blank formed from an aluminum alloy having a composition of 6 weight % tin, 11 weight % silicon, balance aluminum is immersed for 0.5 seconds and withdrawn. A coating of the solution adheres to the blank. The coated blank is then transferred to an air circulation oven and maintained at a temperature of between 300° and 310° C. for about 5 minutes. The solvent evaporates from the coated blank, the blank being allowed to cool naturally. A layer of PCAE 0.01 mm in thickness and having a cystallinity of greater then 40% adheres to the aluminum alloy to form an overlay.

EXAMPLE 4

PCAE powder, 100% passing through a BS 200 mesh seive is intimately mixed with 20 weight % of ICI Fluon VX2 (trade name) which consists of 20% by volume of bronze powder and 20% by volume of graphite filled PTFE moulding powder.

The powders are mixed in a high speed mixer. The polymer powder is then fabricated into a test bearing lining in the following manner. The backing is 1.5 mm thick steel strip having a porous bronze layer comprising spherical particles of BS 60 to BS 100 mesh seive size sintered onto the surface. Pre-dried polymer powder mixture is spread to a thickness of 1.5 mm by means of a vibrating feed hopper onto the backing and then heated by induction heating to a temperature of between 350° and 380° C. The blank is then rolled to consolidate the powder and impregnate the porous bronze interlayer and form a continuous, coherent lining. The coated blank is then allowed to cool naturally and formed into a bearing.

EXAMPLE 5

PCAE was injection moulded into bushes of 20 mm bore, 15 mm length and 1.5 mm wall thickness. The bushes were tested at specific loads of 1.31, 2.63, 3.94, 5.25, 6.57 and 7.88 N/mm$^2$ for 10 cycles at each load. Each cycle consisted of 3 minutes of shaft rotation at the relevant load followed by 3 minutes stopped. During the running period oil was supplied at 25 ml/hour. The bushes satisfactorily completed the test up to and including the highest load without any signs of overheating; the maximum temperature reached being 46° C. By comparison bushes of polyetherketone (PEK) of the same size and tested under identical conditions failed by melting after a total of 20 cycles at the second load of 2.63 N/mm$^2$. Another material based on PEEK, and having additions of PTFE, graphite and bronze survived in the best examples to 6.57 N/mm$^2$ before failing by melting.

The PCAE bushes, in fact, survived the maximum load attainable by the test machine without failure. The load of 7.88 N/mm$^2$ may, therefore, be significantly lower than the potential capacity of the material.

I claim:

1. A plain machinery bearing for operation in the presence of a lubricant, said bearing having a working surface comprising poly cyano aryl ether.

2. A bearing according to claim 1, said bearing being wholly comprised of the poly cyano aryl ether.

3. A bearing according to claim 1, said working surface further including at least one additive selected from the group consisting of alumina, antimony oxide, aramid fibre, asbestos, barium sulphate, boron nitride, cadium sulphide, calcium fluoride, carbon fibres, ceramic powders, clay, chromic oxide, coke, copper oxide, ferric oxide, glass, graphite, graphite fluoride, lead fluoride, lead iodide, lead oxides, lead sulphide, manganese ammonium phosphate, metal fibre, metal flake, metal powders, mica, molybdenum disulphide, phthaloycyanines, polyoxybenzoate, PPS, PTFE, silicon carbide, silicon, talc, wollastonite and zinc sulphide.

4. A bearing according to claim 1, said working surface further including at least one reinforcing additive selected from the group consisting of mica, carbon fibre, aramid fibre, metallic fibre and mineral fibre.

5. A bearing according to claim 4, said working surface further including at least one additive selected from the group consisting of alumina, antimony oxide, aramid fibre, asbestos, barium sulphate, boron nitride, cadium sulphide, calcium fluoride, carbon fibres, ceramic powders, clay, chromic oxide, coke, copper oxide, ferric oxide, glass, graphite, graphite fluoride, lead fluoride, lead iodide, lead oxides, lead sulphide, manganese amminium phosphate, metal fibre, metal flake, metal powders, mica, molybdenum disulphide, phthaloycyanines, polyoxybenzoate, PPS, PTFE, silicon carbide, silicon, talc, wollastonite and zinc sulphide.

6. A bearing according to claim 1 wherein said poly cyano aryl ether working surface is bonded to a strong backing selected from the group consisting of steel, copper alloy and aluminium alloy.

7. A bearing according to claim 6 wherein the thickness of said poly cyano aryl ether working surface lies in the range from 0.1 to 1 mm.

8. A bearing according to claim 7 wherein said thickness lies in the range from 0.2 to 0.4 mm.

9. A bearing according to claim 1 wherein the poly cyano aryl ether material forms a thin layer on top of a metallic bearing material.

10. A bearing according to claim 9 wherein the thickness of said layer lies in the range from 0.01 to 0.05 mm.

11. A bearing according to claim 10 wherein said thickness lies in the range from 0.02 to 0.03 mm.

* * * * *